United States Patent
Aribindi et al.

(10) Patent No.: US 7,120,172 B1
(45) Date of Patent: Oct. 10, 2006

(54) RADIO LINK PROTOCOL FRAMING SYSTEM FOR HIGH SPEED DATA TRANSFER OVER DIGITAL CELLULAR MOBILE TELECOMMUNICATION NETWORKS

(75) Inventors: Syam Prasad Aribindi, Naperville, IL (US); Tejaskumar R. Patel, Lake Hiawatha, NJ (US); Tomas Duncan, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 1067 days.

(21) Appl. No.: 09/663,453

(22) Filed: Sep. 15, 2000

(51) Int. Cl.
*H04J 3/12* (2006.01)

(52) U.S. Cl. .............. 370/524; 370/393; 370/469; 370/471; 370/474

(58) Field of Classification Search ............... 370/393, 370/469, 471, 474, 524
See application file for complete search history.

(56) References Cited

U.S. PATENT DOCUMENTS

| | | | |
|---|---|---|---|
| 5,799,251 A * | 8/1998 | Paavonen | 455/517 |
| 5,978,386 A * | 11/1999 | Hamalainen et al. | 370/466 |
| 6,052,385 A * | 4/2000 | Kanerva et al. | 370/468 |
| 6,292,496 B1 * | 9/2001 | Rasanen | 370/503 |
| 6,389,034 B1 * | 5/2002 | Guo et al. | 370/441 |
| 6,438,119 B1 * | 8/2002 | Kim et al. | 370/335 |
| 6,466,568 B1 * | 10/2002 | Raith et al. | 370/347 |
| 6,614,810 B1 * | 9/2003 | Lee et al. | 370/471 |

FOREIGN PATENT DOCUMENTS

| WO | WO 99/41853 A1 | 8/1999 |
|---|---|---|
| WO | WO 00/74344 A1 | 12/2000 |

* cited by examiner

*Primary Examiner*—Matthew Anderson
*Assistant Examiner*—Sujatha Sharma

(57) ABSTRACT

The Radio Link Protocol framing system provides the mobile wireless station set with high speed data transmission capability by using the Dedicated Control Channel, which comprises a stream of 20 msec frames, to carry a single 18 byte Radio Link Protocol frame and the Supplementary Channel, which comprises a stream of 20 msec frames, to carry many 18 byte Radio Link Protocol frames to accommodate high-speed bursts of data. The Radio Link Protocol framing system packs the Radio Link Protocol frames within the Supplementary Channel (SCH-RLP frames) to maximize the data processing efficiency. The Radio Link Protocol framing system functions to package the subscriber's data into predetermined frame format consisting of Core Units, which are packed, as needed, into one SCH-RLP frame. The data capacity is limited solely by the Supplementary Channel burst capacity. By simply computing the Cyclic Redundancy Check bits to validate the accuracy of the data contained within a SCH-RLP frame enables the system to copy the data directly from the SCH-RLP frame to data receive buffers. Both sequential and non-sequential frames can be incorporated into a single SCH-RLP frame. The Core Unit is the common divisor of both the Dedicated Control Channel and the Supplementary Channel. The Dedicated Control Channel supports transmission of a full frame of 9.6 Kbps, while the Supplementary Channel supports data transmission speeds of 9.6 Kbps and higher.

12 Claims, 3 Drawing Sheets

| 7 | 6 | 5 | 4 | 3 | 2 | 1 | 0 | OCTET/BYTE |
|---|---|---|---|---|---|---|---|---|
| CORE UNIT SEQUENCE NUMBER (16 BITS) | | | | | | | | 1 |
| | | | | | | | | 2 |
| CTL | FRAME-TYPE | | | (MSB) LEN_D: LENGTH OF PAYLOAD | | | | 3 |
| LEN_D: LENGTH OF PAYLOAD (13 BITS) | | | | | | | | 4 |
| DATA (PAYLOAD, MAX 1145 BYTES) | | | | | | | | 5–1149 |

FIG. 2

| 7 | 6 | 5 | 4 | 3 | 2 | 1 | 0 | OCTET/BYTE |
|---|---|---|---|---|---|---|---|---|
| RLP PAYLOAD | | | | | | | | 1–18 BYTES |

FIG. 3

| 7 | 6 | 5 | 4 | 3 | 2 | 1 | 0 | OCTET/BYTE |
|---|---|---|---|---|---|---|---|---|
| (MSB) SEQUENCE NUMBER | | | | | | | | 1 |
| (LSB) SEQUENCE NUMBER | | | | | | | | 2 |
| LEN (1–18) | | | | | | | | 3 |
| CORE UNIT (1–18 BYTES) | | | | | | | | 4–21 |

FIG. 4

| 7 | 6 | 5 | 4 | 3 | 2 | 1 | 0 | OCTET/BYTE |
|---|---|---|---|---|---|---|---|---|
| CORE UNIT SEQUENCE NUMBER (16 BITS) | | | | | | | | 1 |
| | | | | | | | | 2 |
| CTL | FRAME-TYPE | | | LEN | | | | 3 |
| DATA (ONE CORE UNIT: UP TO 18 BYTES) | | | | | | | | 4–21 |

FIG. 5

| 7 | 6 | 5 | 4 | 3 | 2 | 1 | 0 | OCTET/BYTE |
|---|---|---|---|---|---|---|---|---|
| CORE UNIT SEQUENCE NUMBER (16 BITS) | | | | | | | | 1 |
| | | | | | | | | 2 |
| CTL | FRAME-TYPE | | | (MSB) LEN_D: LENGTH OF PAYLOAD | | | | 3 |
| LEN_D: LENGTH OF PAYLOAD (13 BITS) | | | | | | | | 4 |
| DATA (PAYLOAD, MAX 1145 BYTES) | | | | | | | | 5–1149 |

FIG. 6

| 7 | 6 | 5 | 4 | 3 | 2 | 1 | 0 | OCTET/BYTE |
|---|---|---|---|---|---|---|---|---|
| LEN_F: NO. OF CORE FRAMES ||||||||  1 |
| ||||||||  2 |
| CTL || FRAME-TYPE ||| RESERVED 1 ||| 3 |
| CORE-FRAMES |||||||| 4-1149 |

FIG. 7

| 7 | 6 | 5 | 4 | 3 | 2 | 1 | 0 | OCTET/BYTE |
|---|---|---|---|---|---|---|---|---|
| CORE UNIT SEQUENCE NUMBER (16 BITS) |||||||| 1 |
| |||||||| 2 |
| CTL || FRAME-TYPE || (MSB) LEN_D: LENGTH OF PAYLOAD |||| 3 |
| (LSB) LEN_D: LENGTH OF PAYLOAD (13 BITS) |||||||| 4 |
| DATA (PAYLOAD) |||||||| VARIABLE |
| LEN_F: NO. OF CORE FRAMES (2 BYTES) |||||||| VARIABLE |
| CORE-FRAMES |||||||| VARIABLE |

FIG. 8

| 7 | 6 | 5 | 4 | 3 | 2 | 1 | 0 | OCTET/BYTE |
|---|---|---|---|---|---|---|---|---|
| (MSB) SEQ (16 BITS) |||||||| 1 |
| |||||||| 2 |
| CTL |||||||| 3 |
| (MSB) FIRST (16 BITS) |||||||| 4 |
| |||||||| 5 |
| (MSB) LAST (16 BITS) |||||||| 6 |
| |||||||| 7 |
| EM ||| (MSB) EXT_SEQ_M (22 BITS) ||||| 8 |
| |||||||| 9 |
| |||||||| 10 |
| (LSB) FCS (16 BITS) |||||||| 11 |
| |||||||| 12 |
| PADDING |||||||| 13-21 |

RADIO LINK PROTOCOL FRAMING SYSTEM FOR HIGH SPEED DATA TRANSFER OVER DIGITAL CELLULAR MOBILE TELECOMMUNICATION NETWORKS

FIELD OF THE INVENTION

This invention relates to digital cellular mobile telecommunication networks and, in particular, to the provision of a feature in a mobile wireless station set that enables the high speed transmission of data over the wireless communication link with the mobile wireless station set without incurring a penalty of signal processing complexity.

Problem

It is a problem in the field of digital cellular mobile telecommunication networks for network operators and/or service providers to offer a subscriber wireless services that include a high speed data transmission capability for their mobile wireless station set. In view of the proliferation of modems, personal computers and other data processing devices that can be connected to the digital cellular mobile telecommunication network via the subscriber's mobile wireless station set, the provision of high speed wireless data transmission capability becomes an important service offering. The data transmission must not only be high speed, it should be preferably reverse compatible with existing digital cellular mobile telecommunication networks and not require a significant increase in signal processing, or complexity. Existing digital cellular mobile telecommunication networks are presently unable to efficiently provide such a service for the subscriber's mobile wireless station set.

Solution

The above described problems are solved and a technical advance achieved by the present Radio Link Protocol framing system for high speed data transfer over a digital cellular mobile telecommunication network (termed "Radio Link Protocol framing system" herein), which is operable to provide the mobile wireless station set with high speed data transmission capability. This Radio Link Protocol framing system can be used in both GSM/TDMA as well as CDMA environments. The subscriber's mobile wireless station set generates both voice signals as well as data signals. These two types of signals are transmitted over the radio link to the base station where the data is stripped from radio link and routed to a data communication network, while the voice signals are routed to the Public Switched Telephone Network (PSTN).

The digital cellular mobile telecommunication network implements logical traffic and control channels for carrying subscriber communications data (voice and data traffic) and call control signals, respectively. The logical traffic and control channels are mapped on to physical channels on the radio link. In this architecture, the Radio Link Protocol framing system uses the Dedicated Control Channel, which comprises a stream of 20 msec frames, to carry a single 18 byte Radio Link Protocol frame and the Supplementary Channel, which comprises a stream of 20 msec frames, to carry many 18 byte Radio Link Protocol frames to accommodate high-speed bursts of data. The present Radio Link Protocol framing system provides a method of packing the is Radio Link Protocol frames within the Supplementary Channel (SCH-RLP frames) to maximize the data processing efficiency. The Radio Link Protocol framing system functions to package the subscriber's data into predetermined frame format consisting of Core Units. There is no limit on how many Core Units can be packed into one SCH-RLP frame. The data capacity is limited solely by the Supplementary Channel burst capacity. All data transmission rates are treated the same. Simply computing the Cyclic Redundancy Check bits to validate the accuracy of the data contained within a SCH-RLP frame, enables the system to pass the data directly from the SCH-RLP frame to upper layers of the network. Both sequential and non-sequential frames can be incorporated into a single SCH-RLP frame. The Core-Unit used in the present Radio Link Protocol framing system is illustrated in FIG. 2 and consists of a data segment which contains up to 18 bytes of payload and is identified by a two byte sequence number. A Core Frame, illustrated in FIG. 3, comprises a two byte sequence number, a one byte frame length field, followed by a single Core Unit. The Core Unit is the common divisor of both the Dedicated Control Channel and the Supplementary Channel. The Dedicated Control Channel supports transmission of a full frame of 9.6 Kbps, while the Supplementary Channel supports data transmission speeds of 9.6 Kbps and higher.

BRIEF DESCRIPTION OF THE DRAWINGS

FIG. 2 illustrates the structure of a Core Unit used in the present Radio Link Protocol framing system;

FIG. 3 illustrates the structure of a Core Frame used in the present Radio Link Protocol framing system;

FIG. 4 illustrates the structure of a DCCH-RLP frame used in the present Radio Link Protocol framing system;

FIG. 5 illustrates the structure of a SCH-RLP frame for sequential core units used in the present Radio Link Protocol framing system;

FIG. 6 illustrates the structure of a SCH-RLP frame for non-sequential core frames used in the present Radio Link Protocol framing system;

FIG. 7 illustrates the structure of a SCH-RLP frame for sequential core units and non-sequential core frames used in the present Radio Link Protocol framing system; and FIG. 8 illustrates the structure of an RLP control frame used in the present Radio Link Protocol framing system.

DETAILED DESCRIPTION OF THE DRAWINGS

Figure 1:
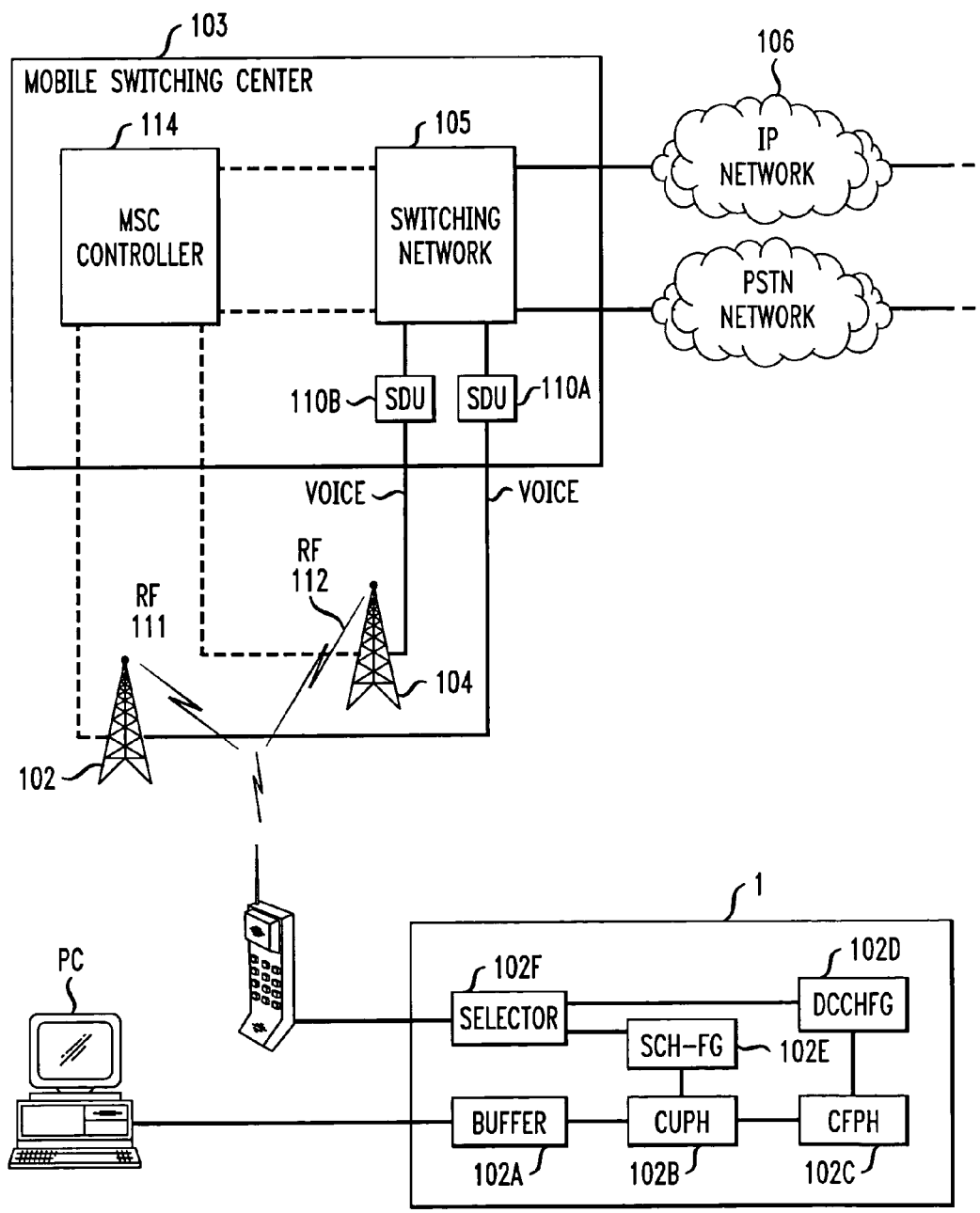
FIG. 1 illustrate the overall architecture of a digital cellular mobile telecommunication network in which the present Radio Link Protocol framing system is implemented.

Definitions:

For the purpose of this description, the following definitions are provided for various terms that are used herein:

Digital Cellular Mobile Telecommunication Network—is a wireless network comprised of base stations, base station control systems, and one or Mobile Switching Centers.

Core-Unit—A data segment which contains up to 18 bytes of payload and is identified by a two byte sequence number.

DCCH-RLP Frame—A frame structure that is used to send data over the Dedicated Control Channel (DCCH), and a full frame contains one Core-unit.

SCH-RLP Frame—A frame structure that is used to send data over the Supplementary Channel (SCH), and a full frame is 460 Kbs which contains up to 63 Core-units.

Network Architecture

In digital cellular mobile telecommunication systems, the mobile wireless station set communicates with the local serving base station as well as adjacent base stations. The base stations are connected to a mobile switching center through a network interface. Each mobile wireless station set includes a mobile termination that serves to provide the radio link functionality and terminal equipment that comprises the subscriber's terminal equipment, such as a telephone station set, fax machine, personal computer, and the like. The mobile termination supports the physical channel between the mobile wireless station set and the base station, including: radio transmissions, radio channel management, channel coding/decoding, speech encoding/decoding, and the like. The base station itself comprises a plurality of base transceiver stations that serve to provide the radio link functionality, and a base station controller. The digital cellular mobile telecommunication network implements logical traffic and control channels for carrying subscriber communications data (voice and data traffic) and call control signals, respectively. The logical traffic and control channels are mapped on to physical channels on the radio link. The logical control channels carry signaling and Supplementary data over one of the four types of control channels: Broadcast Control Channel (BCCH), Common Control Channel (CCCH), Dedicated Control Channel (DCCH), Associated Control Channel (ACCH). There are a number of second generation wireless technologies that are presently in use. In particular, the Interim Standard 136 (IS-136) air interface for digital mobile cellular communications uses Time Division Multiple Access (TDMA) in the 800 MHZ band. The Global System for Mobile Communications GSM is the present European standard for digital mobile cellular communications and operates in the 900-MHZ frequency band and is based on Time Division Multiple Access (TDMA). The Interim Standard 95 (IS-95) air interface for digital mobile cellular communications uses Code Division Multiple Access (CDMA) in the 800 MHZ band. These existing systems typically use a 9.6 Kbps voice data channel and the transmission of data at higher speeds entails the assignment of multiple simultaneous voice channels to a subscriber to achieve higher data transmission rates. In order to accommodate data transmission on the wireless radio links, the IS-95 standard specifies a CDMA-based data service which is based on standard data protocols, to the greatest extent possible. For example, the physical layer of the IS-95 protocol stack is adopted for the physical layer of the data services, with the provision of a Radio Link Protocol overlay. However, the effectiveness of this solution is limited by the signaling overhead required to support this protocol.

With CDMA systems, a plurality of transmitter-receiver pairs share a common frequency pair. This is made possible by the orthogonal coding that is inherent with CDMA. The first stage of a cellular communications connection is executed when transmitter-receiver pair at the base stations, operating on a predetermined pair of radio frequencies, is activated and a mobile subscriber station is tuned to the same pair of radio frequencies and Walsh code. The second stage of the communication connection is executed at the mobile switching office during which the call path is extended to outgoing or incoming trunks to the common carrier public telephone network. At this point in time, the call is considered as being established. The mobile switching center contains a switching network to switch mobile customer's voice and/or data signals from the communication link to an incoming or outgoing trunk. The digital cellular mobile telecommunication system is controlled by a mobile telecommunication controller at or remotely connected to each base station associated with the mobile switching center. A plurality of data links connect the mobile telecommunication controller and the associated base station controllers. The mobile telecommunication controller operates under control of complex software and controls the switching network. The mobile telecommunication controller also controls the actions of the associated base station controllers by generating and interpreting the control messages that are exchanged with the associated base station controllers over the data links. The base station controllers at each base station, in response to control messages from the mobile telecommunication controller, control the assignment of transmitter-receiver pairs at the base station. The control processes at each base station also control the tuning of the mobile subscriber stations to the selected radio frequency.

Digital Cellular Mobile Telecommunication System Architecture

FIG. 1 is the block diagram of the architecture of one example of an existing digital cellular mobile telecommunication system in which the present Radio Link Protocol framing system is implemented. In the description of the disclosed invention, the major entities are the mobile subscriber station 101, base stations 102 and 104, and the Mobile Switching Center 103. The Mobile Switching Center 103 contains a mobile telecommunication controller 114 which controls the operation of Switching Network 105 to provide the telephone connectivity between base stations 102 and 104 and to Public Switched Telephone Network (PSTN) and data communication network 106. Base stations 102 and 104 are connected to the Switching Network 105 through cell site nodes (CSN) 110A, 110B. The mobile switching center 103 has additional functionality such as billing, administration, and maintenance, requiring additional entities. However, the corresponding description of these entities are not essential to the embodiment of the disclosed invention. Base stations 102 and 104 communicate with mobile subscriber station 101 using RF channels 111 and 112, respectively. RF channels 111 and 112 convey both command messages as well as digital data, which may represent voice signals being articulated at the mobile subscriber station 101 and the far-end party. With a CDMA system, the mobile subscriber station communicates with at least one base station 102. In FIG. 1, the mobile subscriber station 101 is simultaneously communicating with two base stations 102, 104, thus constituting a soft handoff. However, a soft handoff is not limited to a maximum of two base stations. Standard EIA/TIA IS-95-B supports a soft handoff with as many as six base stations. When in a soft handoff, the base stations serving a given call must act in concert so that commands issued over RF channels 111 and 112 are consistent with each other. In order to accomplish this consistency, one of the serving base stations may operate as the primary base station with respect to the other serving base stations. The base stations communicate with other base stations through the cell site nodes 110A, 110B. Of course, a mobile subscriber station 101 may communicate with only a single base station if determined as sufficient by the wireless communications system.

The control channels that are available in this digital cellular mobile telecommunication system are used to setup the communication connections between the mobile subscriber stations 101 and the base station 102. When a call is initiated, the control channel is used to communicate between the mobile subscriber station 101 involved in the call and the local serving base station 102. The control messages locate and identify the mobile subscriber station 101, determine the dialed number, and identify an available voice/data communication channel consisting of a pair of radio frequencies and orthogonal coding which is selected by the base station 102 for the communication connection. The radio unit in the mobile subscriber station 101 retunes the transmitter-receiver equipment contained therein to use these designated radio frequencies and orthogonal coding. Once the communication connection is established, the control messages are typically transmitted to adjust transmitter power and/or to change the transmission channel when required to handoff this mobile subscriber station 101 to an adjacent cell, when the subscriber moves from the present cell to one of the adjoining cells. The transmitter power of the mobile subscriber station 101 is regulated since the magnitude of the signal received at the base station 102 is a function of the mobile subscriber station transmitter power and the distance from the base station 102. Therefore, by scaling the transmitter power to correspond to the distance from the base station 102, the received signal magnitude can be maintained within a predetermined range of values to ensure accurate signal reception without interfering with other transmissions in the cell.

Radio Link Protocol Data Communications

In third generation digital cellular mobile telecommunication systems, Radio Link Protocol (RLP) frames are carried over both the Dedicated Control Channel (DCCH) and the Supplementary Channel (SCH). The present Radio Link Protocol framing system 1 uses the standard Dedicated Control Channel, which comprises a stream of 20 msec frames, to carry a single 18 byte Radio Link Protocol frame, similar to existing TIA/EIA 707 based systems and the standard Supplementary Channel, which is a stream of 20 msec frames, to carry many 18 byte Radio Link Protocol frames to accommodate high-speed bursts of data. The present Radio Link Protocol framing system 1 also provides a method of packing the Radio Link Protocol frames within the Supplementary Channel to maximize the data processing efficiency. The Radio Link Protocol frame format is selected to be substantially the same as the existing TIA/EIA 707 frame format, with the following exceptions:

a.) The sequence number is changed from a one-byte field to a two-byte field.

b.) The number of bytes is reduced from 19 bytes to 18 bytes in a full frame. For the Supplementary Channel, a new Radio Link Protocol frame format is selected to efficiently carry large blocks of Radio Link Protocol data. In operation, the Dedicated Control Channel is used to transmit short messages at 9.6 Kbps using DCCH-RLP framing. The Supplementary Channel is used for burst transmission at rates of 9.6 Kbps and higher, using SCH-RLP frame format. The Radio Link Protocol framing system 1 achieves these data rates by the use of a Core Unit and Core Frames as described below.

In operation, the Radio Link Protocol framing system 1 receives data from the subscriber's terminal equipment, such as a personal computer PC, and stores this data in a buffer 102A for transmission over the radio link to the base station 110. The data transmission rate required to support this link is a function of the volume of data generated by the personal computer PC and/or required to be downloaded to the personal computer PC. The Radio Link Protocol framing system 1 packages the data into Core Units via Core Unit Protocol Handler 102B for transmission over the Dedicated Control Channel and/or the Supplementary Channel. The basic format of the Core Unit is used for both modes of communication and the Core Frame is implemented in the Supplementary Channel to provide a data transmission rate of 9.6 Kbps and higher via the Core Frame Protocol Handler 102C.

Core Unit and Core Frame Structure

The Core-Unit used in the present Radio Link Protocol framing system 1 is illustrated in FIG. 2, as formed by Core Unit Protocol Handler 102B. The Core Unit consists of a data segment which contains up to 18 bytes of payload and is identified by a two byte sequence number. A Core Frame, illustrated in FIG. 3 and formed by Core Frame Protocol Handler 102C, comprises a two byte sequence number, a one byte frame length field, followed by a single Core Unit. The Core Unit is the common divisor of both the Dedicated Control Channel and the Supplementary Channel. The Dedicated Control Channel supports transmission of a full frame of 9.6 Kbps, while the Supplementary Channel supports data transmission speeds of 9.6 Kbps and higher. Retransmission of data is not tied to a particular channel and the data can be transmitted as a large contiguous block with and without Cyclic Redundancy Checks (CRC) for each Core Unit. In the former case, a valid CRC determination is considered to represent a correct Core Frame. Otherwise, the entire Core Frame is retransmitted on any available channel. In the latter case, detection of an error in the core frame CRC results in each Core Unit CRC being checked to localize the error and salvage the Core Unit which contains the error. This process eliminates the need to retransmit entire Core Frames upon detection of an error.

DCCH-RLP Frame

FIG. 4 illustrates the structure of a Dedicated Control Channel-Radio Link Protocol (DCCH-RLP) frame formed by the DCCH Frame Generator 102D used in the present Radio Link Protocol framing system 1, where the frame is 21 bytes long, with each byte comprising 8 bits. The first two bytes (16 bits) of this frame consists of the Core Unit sequence number which is a sequence identifying number that is assigned to this DCCH-RLP frame. The next or third byte of the DCCH-RLP frame consists of a control bit, followed by two bits, which define the type of frame, to thereby indicate that this frame is a DCCH-RLP frame. The remaining five bits of the third byte is a length field which defines the number of data bytes in the Core Unit that is contained in this DCCH-RLP frame, with the length ranging from 1 byte to a maximum of 18 bytes. The remaining bytes contained in this DCCH-RLP frame consists of the Core Unit which contains the subscriber data.

Framing for Transmission of a Block of Data

The transmission of a large block of data requires the use of multiple Supplementary Channel-Radio Link Protocol (SCH-RLP) frames or a single large SCH-RLP frame, as formed by Supplementary Channel Frame Generator 102E. For example, to achieve a data transmission rate of 460.8 Kbps, the size of the SCH-RLP frame required is (460,800*20/1,000)/8=1152 bytes. Similarly, for a data transmission rate of 57.6 Kbps, the size of the SCH-RLP frame required is (57,600*20/1,000)/8=144 bytes. However, there is an overhead cost in the data transmission for Radio Link Protocol of three bytes that are reserved for the IS-95 protocol. Therefore, the number of 18 byte Core Units required to effect the above noted 460.8 Kbps and 57.6 Kbps data transmission rates, given the three byte overhead is: 64 Core Units and 8 Core Units, respectively. Thus, the data transmission can be simply implemented by packing Core Units into SCH-RLP frames.

SCH-RLP Frame for Sequential Core Units

FIG. 5 illustrates the structure of a SCH-RLP frame for sequential Core Units used in the present Radio Link Protocol framing system that can be used to transmit multiple Core Units. The first two bytes (16 bits) of this frame consists of the Core Unit sequence number which is a sequence identifying number that is assigned to this SCH-RLP. The next or third byte of the SCH-RLP frame consists of a control bit, followed by two bits which define the type of frame, to thereby indicate that this frame is a SCH-RLP frame that contains sequential Core Units. The remaining five bits of the third byte and the entirety of the fourth byte are a length field which defines the number of data bytes in the Core Frame that is contained in this SCH-RLP frame, with the length ranging from 1 byte to a maximum of 1149 bytes. The remaining bytes (5-up to 1149) contained in this DCCH-RLP frame consists of the plurality of Core Units which contain the subscriber data.

This structure minimizes the overhead of the SCH-RLP frame, since a single sequence number is used for the plurality of Core Units contained in the SCH-RLP frame. The use of a single sequence number rather than one per Core Unit increases the amount of data that can be packed into each Core Unit of the SCH-RLP frame. In addition, the payload of the SCH-RLP frame consists of a plurality of contiguous Core Units and can therefore be transported to the upper layers of a data transmission protocol without the need to use a traditional scatter/gather segmentation/reassembly process.

SCH-RLP Frame for Non-Sequential Core Frames

FIG. 6 illustrates the structure of a SCH-RLP frame for non-sequential Core Frames used in the present Radio Link Protocol framing system 1 that can be used to transmit multiple non-sequential Core Frames. The first two bytes (16 bits) of this frame consists of the Length Field which defines the number of Core Frames contained in this SCH-RLP frame. The next or third byte of the SCH-RLP frame consists of a control bit, followed by two bits which define the type of frame, to thereby indicate that this frame is a SCH-RLP frame that contains non-sequential Core Frames. The remaining five bits of the third byte are reserved to identify frames from different Radio Link Protocol agents. The remaining bytes (4-up to 1149) contained in this DCCH-RLP frame consists of the plurality of Core Frames which contain the subscriber data. Each Core Frame contains a one byte length field, a two byte Core Unit sequence number, followed by an 18 byte payload for a total of 21 bytes.

In addition, non-sequential frames can be packed into an SCH-RLP frame format, which is useful for selective retransmission.

SCH-RLP Frame for Sequential Core Units and Non-Sequential Core Frames

FIG. 7 illustrates the structure of a SCH-RLP frame for sequential Core Units and non-sequential Core Frames used in the present Radio Link Protocol framing system 1 that can be used to transmit multiple Core Units. The first two bytes (16 bits) of this frame consists of the Core Unit sequence number which is a sequence identifying number that is assigned to this SCH-RLP frame. The next or third byte of the SCH-RLP frame consists of a control bit, followed by two bits which define the type of frame, to thereby indicate that this frame is a SCH-RLP frame that contains sequential Core Units. The remaining five bits of the third byte and the entirety of the fourth byte are a length field which defines the number of data bytes in the Core Frame that is contained in this SCH-RLP frame, with the length being variable. The next successive predetermined plurality of bytes contained in this DCCH-RLP frame consists of a Data Payload containing the plurality of Core Units which contain the subscriber data. Following the Data Payload, the entirety of the next two successive bytes are a length field which defines the number of Core Frames that are contained in the remainder of this SCH-RLP frame.

RLP Control Frame

FIG. 8 illustrates the structure of an RLP control frame used in the present Radio Link Protocol framing system 1. The first two bytes (16 bits) of this frame consists of the Core Unit sequence number which is a sequence identifying number that is assigned to this SCH-RLP frame. The third byte of this frame is a control byte that identifies this type of Radio Link Protocol frame. The string '1100 0000' is a NACK message, which signifies a request for retransmission of a prior Core Frame, which is identified in the following four bytes which define the first and last data frames of the transmission which must be retransmitted. The string '1101 0000' represents the message "non-encrypted mode SYNC" which requests return of a Radio Link Protocol control frame with the ACK bit set. The string '1101 0011' represents the message "encrypted mode SYNC" which requests return of a Radio Link Protocol control frame with the ACK bit set. The string '1110 0000' represents the message "non-encrypted mode ACK" which acknowledges receipt of a Radio Link Protocol control frame with the SYNC bit set. The string '1110 0011' represents the message "encrypted mode ACK" which acknowledges receipt of a Radio Link Protocol control frame with the SYNC bit set. The string '1111 0000' represents the message "non-encrypted mode SYNC/ACK" which indicates both SYNC and ACK. The string '1111 0011' represents the message "encrypted mode SYNC/ACK" which indicates both SYNC and ACK. The remaining fields of the RLP control frame are the same as the standard TIA/EIA/IS-707.02 control frame.

SUMMARY

The Radio Link Protocol framing system provides the mobile wireless station set with high speed data transmission capability by using the Dedicated Control Channel, which comprises a stream of 20 msec frames, to carry a single 18 byte Radio Link Protocol frame and the Supplementary Channel, which comprises a stream of 20 msec frames, to carry many 18 byte Radio Link Protocol frames to accommodate high-speed bursts of data. The Radio Link Protocol framing system packs the Radio Link Protocol frames within the Supplementary Channel (SCH-RLP frames) to maximize the data processing efficiency.

What is claimed is:

1. A radio link protocol framing system located in a subscriber's mobile wireless station set for providing said subscriber's mobile wireless station set with high speed data transmission capability by using the dedicated control channel of the radio link that interconnects said subscriber's mobile wireless station set with a digital cellular mobile telecommunication network, comprising:

means, responsive to a subscriber at said subscribers mobile wireless station set requesting a data communication service, for storing data generated by terminal equipment at said subscriber's mobile wireless station set;

means for segmenting said data in at least one core unit, each core unit exclusively comprising a payload of predetermined size;

means, responsive to the existence of a presently active radio link, comprising a dedicated traffic channel presently in use by said-subscriber's mobile wireless station set and an associated dedicated control channel, for selecting said associated dedicated control channel of said presently active radio link to transmit said data to said digital cellular mobile telecommunication network; and means for packaging said at least one core unit into a radio link protocol to transmit said data to said digital cellular mobile telecommunication network via said dedicated control channel of said presently active radio link.

2. The radio link protocol framing system of claim 1 wherein said means for formatting comprises:

means for selecting a single one of said core units; and means for prepending a header to said selected core unit, said header including: a sequence number, a payload length.

3. The radio link protocol framing system of claim 2 wherein said means for formatting further comprises:

means for including a field in said header that indicates the content of said radio link protocol is for said dedicated control channel of said radio link.

4. The radio link protocol framing system of claim 1 wherein said means for formatting comprises:

means for concatenating a plurality of said core units;

means for prepending a header to said concatenated core units, said header including: a sequence number, a payload length.

5. The radio link protocol framing system of claim 4 wherein said means for formatting further comprises:

means for including a field in said header that indicates the content of said radio link protocol is for said Supplementary channel of said radio link.

6. The radio link protocol framing system of claim 5 wherein said means for formatting further comprises:

means for selecting a single one of said core units;

means for prepending a header to said selected core unit, said header including: a sequence number, a payload length; and means for appending said header and said selected core unit to said concatenated core units.

7. A method for providing a subscriber's mobile wireless station set with high speed data transmission capability by using the dedicated control channel of a radio link that interconnects said subscriber's mobile wireless station set with a digital cellular mobile telecommunication network, comprising the steps of:

storing in a memory, in response to a subscriber at said subscribers mobile wireless station set requesting a data communication service, data generated by terminal equipment at said subscriber's mobile wireless station set;

segmenting said data in at least one core unit, each core unit exclusively comprising a payload of predetermined size;

selecting, in response to the existence of a presently active radio link, comprising a dedicated traffic channel presently in use by said subscriber's mobile wireless station set and an associated dedicated control channel, for selecting said associated dedicated control channel of said presently active radio link to transmit said data to said digital cellular mobile telecommunication network; and packaging said at least one core unit into a radio link protocol to transmit said data to said digital cellular mobile telecommunication network via said dedicated control channel of said presently active radio link.

8. The method for providing a mobile wireless station set with high speed data transmission capability of claim 7 wherein said step of formatting comprises:

selecting a single one of said core units; and prepending a header to said selected core unit, said header including: a sequence number, a payload length.

9. The method for providing a mobile wireless station set with high speed data transmission capability of claim 8 wherein said step of formatting further comprises:

including a field in said header that indicates the content of said radio link protocol is for said dedicated control channel of said radio link.

10. The method for providing a mobile wireless station set with high speed data transmission capability of claim 7 wherein said step of formatting comprises:

concatenating a plurality of said core units;

prepending a header to said concatenated core units, said header including: a sequence number, a payload length.

11. The method for providing a mobile wireless station set with high speed data transmission capability of claim 10 wherein said step of formatting further comprises:

including a field in said header that indicates the content of said radio link protocol is for said Supplementary channel of said radio link.

12. The method for providing a mobile wireless station set with high speed data transmission capability of claim 11 wherein said step of formatting further comprises:

selecting a single one of said core units;

prepending a header to said selected core unit, said header including: a sequence number, a payload length; and appending said header and said selected core unit to said concatenated core units.

* * * * *